March 17, 1925.   1,530,110

G. E. CURTISS

ELECTRIC COOKER

Filed July 5, 1923

INVENTOR
George E. Curtiss
BY
ATTORNEYS

Patented Mar. 17, 1925.

1,530,110

UNITED STATES PATENT OFFICE.

GEORGE E. CURTISS, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRIC COOKER.

Application filed July 5, 1923. Serial No. 649,711.

*To all whom it may concern:*

Be it known that I, GEORGE E. CURTISS, a citizen of the United States, residing at New Britain, county of Hartford, and State of Connecticut, have invented certain new and useful Improvements in Electric Cookers, fully described and represented in the following specification and the accompanying drawings, forming a part of the same.

This invention relates to electric cookers commonly known as grills.

It is the principal object of the invention to provide an improved cooker particularly adapted for dining room table use.

With this general object in view, the invention consists in the combinations, details of construction and arrangement of parts which will first be described in connection with the accompanying drawing and then more particularly pointed out.

In the drawing—

Figure 1:
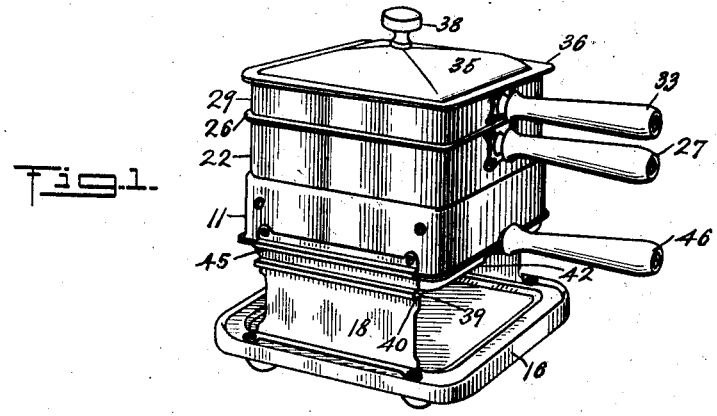
Fig. 1 is a perspective view of an electric cooker constructed in accordance with the invention.

Referring to the drawing, the cooker shown comprises a casing for containing a heating element and a grill. As here shown as an example, there is provided a casing 11 square in outline and having straight upright sides 12 and flat bottom 13 and open at the top. Secured within the casing between the top and the bottom thereof is a grill 14. Below the grill is a space 15 for a heating element (not shown) which may be of any suitable description.

There is provided a support for the casing and in constructions embodying the invention to the best advantage the support comprises a tray-like base and an elevating standard. As here shown as an example, the support includes a square base 16 which is considerably larger than the casing and the pans to be described, and acts as a tray. On the base shown are feet 17 of rubber or the like. While the elevating standard may vary in construction, as here shown as an example, secured to the base 16 are two oppositely disposed upright plates 18. These plates are so spaced apart that the lower part of the casing 11 may be received between their upper edges. The casing is secured to the plates by screws 19 or the like so as to be elevated by the support as clearly appears in the drawing.

The invention in its entirety includes a cooking pan adapted to seat on the grill and to be positioned by the upper part of the casing, and in constructions embodying the invention to the best advantage, the pan has substantially straight sides and a flat bottom. As here shown as an example, there is provided a cooking pan 22, square in outline and having straight sides 23 and a flat bottom 24, which are connected by curved portions 25. At the top of the pan the metal is turned outwardly to form a supporting rim 26. The size of the pan 22 is such that it has an easy telescoping fit within the top of the casing 11. For use in cooking, the pan seats on the grill 14 and is held in position by the embrace of the upper part of the casing. It may be removed at will simply by lifting it out, a handle 27 being provided for this purpose. With the construction described, the cooking pan is readily positioned in the cooker and at the same time the pan presents a smooth, plain interior which is readily kept clean and which has no crevices, shoulders or the like which would tend to cause dirt to accumulate.

Figure 2:
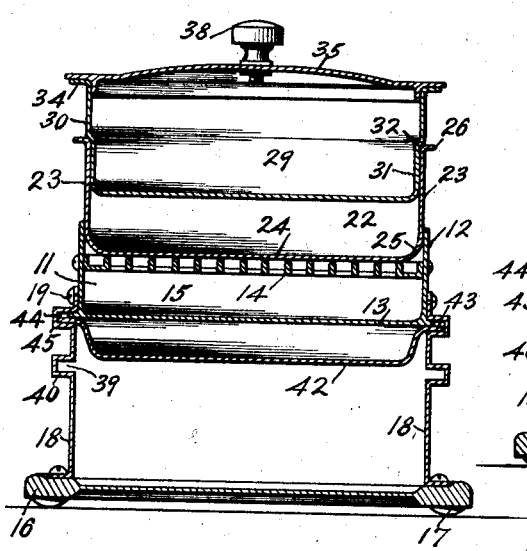
Fig. 2 is a vertical sectional view of the same.

There is provided a second cooking pan for use with the pan first described and which has means whereby it may be suspended in the first pan. As here shown as an example, the second pan 29 is also square in outline. Its upper portion 30 has substantially the same size as the pan 22 and its lower portion 31 is reduced sufficiently to have an easy telescoping fit within the pan 22, these two portions being connected by a shoulder 32. The pan 29 has a handle 33 and a top rim 34. When the pan 29 is to be used, it is inserted in the pan 22, the shoulder 32 seating on the rim 26, the lower portion 31 being embraced by the upper part of pan 22. In this position, shown in Fig. 2, the two pans form, in effect, a double boiler.

Figure 3:
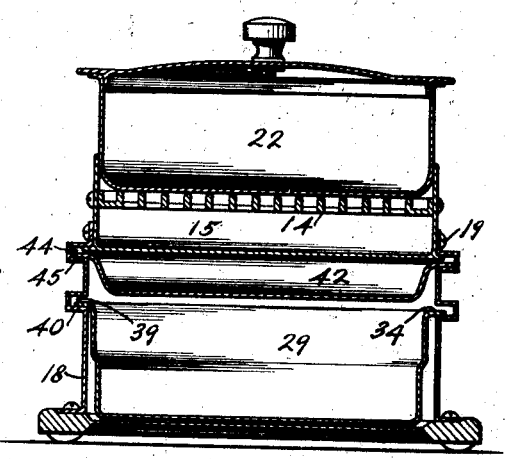
Fig. 3 is a similar view showing the parts in a different position.
Figure 4:
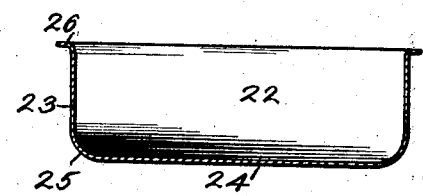
Fig. 4 is a sectional view of one of the pans taken at right angles to the section of Figs. 2 and 3.

There is provided a cover adapted to serve with either of the pans. As here shown as an example, a cover 35, square in outline, has a flat rim 36 and, within this rim, a positioning flange 37 extending downwardly. As shown in Fig. 3, the rim 36 of the cover seats on rim 26 of pan 22, the cover being positioned by telescoping relation between flange 37 and the top of pan 22. As the upper portion of pan 29 has substantially the same size as pan 22, when pan 29 is in use the cover 35 can be positioned on this pan in the same way. Fig. 3 shows the cover positioned on pan 29. The cover has a knob or handle 38 by which it may be manipulated.

There is provided cooperating means associated with the second pan and the support whereby the pan may be suspended in the support below the casing when not in use. Although capable of various constructions, as here shown, the plates 18 of the support are bent into channels 39 to provide supporting ledges 40 extending outwardly. These ledges are adapted to receive the rim 34 of the pan 29 to suspend the pan in the support. As shown in Fig. 3, when not wanted for use, the pan is removed from pan 22, its rim 34, on two opposite sides, is inserted in channels 39 and it is pushed into place below the casing. With the construction described, the second pan is readily and compactly retained in the cooker when not in use.

There is provided a griddle and means for mounting the same in the support to act as a heat deflector. As here shown, a shallow griddle 42, square in outline, has a rim 43. Just below the casing 11, the support plates 18 have channels 44 like channels 39, which provide supporting ledges 45 for receiving the rim 43 of the griddle. The drawings show the griddle suspended in the support just below the casing 11. In this position it serves to deflect the heat upwardly from the support. When it is desired to use the griddle, it is drawn out of the support and placed on the casing. A handle 46 is provided for manipulation of the griddle.

What I claim is:

1. An electric cooker comprising a casing for containing a heating element and open at the top, a support for the casing comprising an elevating standard having a pair of supporting ledges, a grill in said casing below the rim thereof, a cooking pan adapted to seat on said grill with its lower part positioned by the upper part of the casing, a second cooking pan having a shoulder formed in its side wall, whereby it may be suspended on the rim of the first pan with its lower part within and positioned by the upper part of the first pan, and having also a pair of flanges cooperating with said supporting ledges, whereby it may be suspended in the support below the casing when not inserted in the first pan, and a cover adapted to fit either of said pans.

2. An electric cooker comprising a casing for containing a heating element and open at the top, a support for said casing comprising an elevating standard, a grill in said casing below the rim thereof, a cooking pan adapted to seat on said grill with its lower part positioned by the upper part of the casing, and a second cooking pan having means whereby it may be suspended partly within the first pan, while the first pan is in cooking position on the grill, said support and said second pan having cooperating means whereby the second pan may be carried by the support below the casing when not inserted in the first pan.

3. An electric cooker comprising a casing for containing a heating element and having an open top, a grill within the casing below the top thereof, a support for the casing comprising a tray-like base and two oppositely disposed upright plates to which the casing is secured, a cooking pan adapted to seat on said grill, and a second cooking pan having means whereby it may be suspended partly within the first pan, said second pan and said plates having cooperating means whereby the second pan may be carried by the support when not inserted in the first pan.

4. An electric cooker comprising a casing for containing a heating element, a support for the casing comprising an elevating standard having a pair of supporting ledges adjacent the bottom of the casing, and a griddle having a rim adapted to be received by said ledges, whereby the griddle may be suspended just below the casing to act as a heat deflector when not in use as a cooking utensil.

In testimony whereof, I have hereunto set my hand.

GEORGE E. CURTISS.